Patented Feb. 16, 1926.

1,573,604

UNITED STATES PATENT OFFICE.

BERTRAND B. GRUNWALD, OF ALAMEDA, CALIFORNIA.

PROCESS FOR MAKING LIGHT BASIC CARBONATE OF MAGNESIUM.

No Drawing.   Application filed June 30, 1924.   Serial No. 723,152.

*To all whom it may concern:*

Be it known that I, BERTRAND B. GRUNWALD, a citizen of Czechoslovakia, residing at Alameda, county of Alameda, and State of California, have invented new and useful Improvements in Processes for Making Light Basic Carbonate of Magnesium, of which the following is a specification.

This invention relates to a process for manufacturing light basic carbonate of magnesium and heat-insulating means formed therefrom.

It is well-known that carbonate of magnesium has been used for many years in the manufacture of means used for heat-insulating purposes.

It is one object of my invention to provide a process for manufacturing an improved carbonate of magnesium which, as hereinafter disclosed, has various characteristics particularly adapting it for use for the purpose stated.

Another object of my invention is a continuation of the above process to form heat-insulating means, wherein the product of the above process is used as an ingredient.

The final product made by my improved process is extremely light and of great strength after it is dried, and, therefore, is especially adapted for use as heat-insulating material. For this purpose my process is further valuable inasmuch as it permits absolute control of the weight and strength of the carbonate of magnesium produced. A further advantage of this process is the fact that it will produce a light carbonate of magnesium which, contrary to the magnesium produced by any other process, will not shrink in the drying.

The particular advantages of all these improved characteristics will be obvious to one skilled in the art of heat-insulating materials of this type.

My process may be carried out in various forms, the form used depending upon certain conditions as will hereinafter appear. It will be seen, however, that the base used in all the herein described forms of my improved process is the heavy basic carbonate of magnesium which is the product of my novel process forming the subject-matter of my co-pending application Serial Number 723,151, filed June 30, 1924.

This heavy basic carbonate of magnesium is formed in the following manner; I mix one part of ground calcined magnesite with ten to fifteen parts of water and introduce carbon dioxide gas into this mixture. Due to the exothermic chemical recation between the carbon dioxide ($CO_2$) and the magnesium oxide (MgO), the temperature of the mixture will rise gradually. The heat formed by the chemical reaction, of course, varies with the proportions of water used. The proportions of water used should, therefore be such that at the termination of carbonization the temperature will be approximately 100° Fahrenheit. When a temperature of approximately 100° Fahrenheit is reached I stop the introduction of the carbon dioxide gas. I then allow the mixture to rest for a period of twenty minutes to several hours. During this resting period the carbonate of magnesium keeps on expanding in volume. When the proper physical consistency is reached, it can be used immediately or stored for future use by cooling the same by the addition of more cold water.

Following is a description of my process: I place a mixture of heavy basic carbonate of magnesium and water into a tank, the walls of which are insulated against loss of heat. I then bring the temperature of this mixture, through heating under agitation, to 100°—120° Fahrenheit. After this temperature is reached, I allow the contents of the tank to stand for a considerable time. The carbonate of magnesium thus treated will of its own accord keep on expanding in volume. In order to insure a uniform expansion I agitate the contents of the tank for a few minutes at intervals of two to three hours. The expansion reaches its maximum in twelve to fifteen hours.

The product resulting from the above described process is a light basic carbonate of magnesium ready for use in forming heat-insulating means, such as boiler or pipe coverings. In use, this product is mixed with asbestos and molded into the shape of the desired finished article. I then heat the molded product to a minimum temperature of 150° Fahrenheit to 250° Fahrenheit previously to drying the same. The resulting article is light in weight, of great strength and of original molded shape, since the same does not shrink in drying.

Time forms a very important part of the process just described above. If it is desired to eliminate this time factor the process may be carried out in the following manner:

After the mixture of the heavy carbonate of magnesium and the water is placed into a suitable tank, I heat this mixture under agitation to a temperature of approximately 140° Fahrenheit. When this temperature is reached the carbonate of magnesium has usually expanded sufficiently and I add a sufficient amount of cold water to prevent further expansion. This latter step is necessary in order to prevent the formation of a carbonate of magnesium so light that the same would have little mechanical strength.

The light carbonate of magnesium made by either form of my above described method is not well adapted for storing. Should it be desirable to store this material for any great length of time without impairing the mechanical strength of the final product, I may vary the process in the following manner:

I heat the mixture of heavy basic carbonate of magnesium and water under agitation to a temperature of approximately 180° Fahrenheit. I then let the mixture stand until maximum expansion has taken place. The magnesium made in this way is extremely light and has no mechanical strength when dry. In order to make this material strong and give it the proper strength, I mix with the same, adequate parts of heavy basic carbonate of magnesium previously to the molding.

It should be understood that molded articles made by any of the various forms of my herein described method are heated to a minimum temperature of 150° Fahrenheit previously to or during the operation of drying.

I claim:

1. The process of manufacturing a light basic carbonate of magnesium, consisting of heating a mixture of heavy basic carbonate of magnesium and water to a temperature ordinarily above 100° Fahrenheit, whereupon the carbonate of magnesium absorbs the water and expands in volume, and permitting the expansion to continue until the resulting product has reached a desired density.

2. The process of manufacturing a light basic carbonate of magnesium, consisting of heating a mixture of heavy basic carbonate of magnesium and water to a temperature ordinarily above 100° Fahrenheit, whereupon the carbonate of magnesium absorbs the water and expands in volume permitting the expansion to continue until the resulting product has reached a desired density, and thereupon terminating the expanding process by cooling the mixture.

3. The process of manufacturing a light basic carbonate of magnesium, consisting of heating a mixture of heavy basic carbonate of magnesium and water to a temperature ordinarily above 100° Fahrenheit, whereupon the carbonate of magnesium absorbs the water and expands in volume, permitting the expansion to continue until the resulting product has reached a desired density, and thereupon terminating the expanding process by cooling the mixture by the addition of cold water thereto.

4. The process of manufacturing a light basic carbonate of magnesium, consisting of heating a mixture of heavy basic carbonate of magnesium and water to a temperature above 100° Fahrenheit and allowing the mixture to stand in a heat-tight receptacle for a period of six to twenty hours under periodical agitation.

5. The process of manufacturing a light basic carbonate of magnesium, consisting of heating a mixture of heavy carbonate of magnesium and water under agitation to a temperature above 100° Fahrenheit, whereupon the carbonate of magnesium expands in volume, and then cooling the mixture by adding cold water to prevent further expansion.

6. The process of manufacturing a light basic carbonate of magnesium, consisting of heating a mixture of heavy carbonate of magnesium and water under agitation to a temperature not exceeding 180 degrees Fahrenheit, whereupon the carbonate of magnesium expands in volume, and then cooling the mixture by adding cold water to prevent further expansion.

7. The process of manufacturing a light basic carbonate of magnesium, consisting of heating a mixture of heavy carbonate of magnesium and water under agitation to a temperature of 100 degrees to 180 degrees Fahrenheit, whereupon the carbonate of magnesium expands in volume, and then cooling the mixture by adding cold water to prevent further expansion.

8. The process of manufacturing a light basic carbonate of magnesium, consisting of heating a mixture of heavy carbonate of magnesium and water under agitation to a temperature of not less than 140 degrees and not more than 180 degrees Fahrenheit, whereupon the carbonate of magnesium expands in volume, and then cooling the mixture by adding cold water to prevent further expansion.

9. The process of manufacturing a light basic carbonate of magnesium, consisting of heating a mixture of heavy carbonate of magnesium and water under agitation to a temperature of approximately 180 degrees Fahrenheit, whereupon the carbonate of magnesium expands in volume and then cooling the mixture by adding cold water to prevent further expansion.

10. The process of manufacturing a light basic carbonate of magnesium, consisting of heating under agitation a mixture of heavy carbonate of magnesium and water to a temperature of approximately 180° Fahrenheit, cooling the product to a desired temperature and thereafter adding adequate proportions of heavy carbonate of magnesium to form a light and strong material when the product is dry.

BERTRAND B. GRUNWALD.